United States Patent
Eastoe et al.

(10) Patent No.: US 11,066,889 B2
(45) Date of Patent: Jul. 20, 2021

(54) SUBSEA ASSEMBLY

(71) Applicant: SIEMENS ENERGY AS, Oslo (NO)

(72) Inventors: Andrew Robert Eastoe, Urangsvag (NO); Kjetil Haldorsen, Rubbestadneset (NO); Hans Knutsson, Stord (NO)

(73) Assignee: SIEMENS ENERGY AS, Oslo (NO)

(*) Notice: Subject to any disclaimer, the term of this patent is extended or adjusted under 35 U.S.C. 154(b) by 0 days.

(21) Appl. No.: 16/977,325

(22) PCT Filed: Jan. 31, 2019

(86) PCT No.: PCT/EP2019/052402
§ 371 (c)(1),
(2) Date: Sep. 1, 2020

(87) PCT Pub. No.: WO2019/174811
PCT Pub. Date: Sep. 19, 2019

(65) Prior Publication Data
US 2021/0002971 A1    Jan. 7, 2021

(30) Foreign Application Priority Data
Mar. 13, 2018 (EP) .................................. 18161549

(51) Int. Cl.
*E21B 33/037* (2006.01)
*E21B 47/017* (2012.01)
(Continued)

(52) U.S. Cl.
CPC .......... *E21B 33/037* (2013.01); *E21B 33/038* (2013.01); *E21B 47/017* (2020.05); *E21B 47/07* (2020.05)

(58) Field of Classification Search
CPC ...... E21B 33/037; E21B 33/038; E21B 47/07; E21B 47/017
(Continued)

(56) References Cited

U.S. PATENT DOCUMENTS

| | | |
|---|---|---|
| 2002/0088622 A1 | 7/2002 | Beall et al. |
| 2012/0280496 A1 | 11/2012 | Ben-Reuven et al. |
| 2017/0175927 A1* | 6/2017 | Kotrla ................... E21B 33/062 |

FOREIGN PATENT DOCUMENTS

| | | |
|---|---|---|
| EP | 3088850 A1 | 11/2016 |
| EP | 3269921 A1 | 1/2018 |

(Continued)

OTHER PUBLICATIONS

PCT International Search Report and Written Opinion of International Searching Authority dated May 7, 2019 corresponding to PCT International Application No. PCT/EP20191052402 filed Jan. 31, 2019.

*Primary Examiner* — Matthew R Buck
*Assistant Examiner* — Patrick F Lambe
(74) *Attorney, Agent, or Firm* — Wolter Van Dyke Davis, PLLC

(57) ABSTRACT

A subsea assembly includes a housing having a flange interface for interfacing with a flange of a process fluid carrying component, wherein the housing is configured such that boltheads or nuts exerting a fastening force on the subsea assembly when mounted to the process fluid carrying component are spaced from the flange interface so that the dimensions of the housing of the subsea assembly at the flange interface are not affected by a space required for a bolthead or nut fastening tool.

14 Claims, 1 Drawing Sheet

(51) Int. Cl.
 *E21B 47/07* (2012.01)
 *E21B 33/038* (2006.01)
(58) Field of Classification Search
 USPC .......................................................... 166/356
 See application file for complete search history.

(56) References Cited

FOREIGN PATENT DOCUMENTS

| | | |
|---|---|---|
| EP | 3511516 A1 | 7/2019 |
| EP | 3511517 A1 | 7/2019 |
| EP | 3511518 A1 | 7/2019 |
| EP | 3511519 A1 | 7/2019 |
| WO | 2016119943 A1 | 8/2016 |
| WO | 2017084769 A1 | 5/2017 |

* cited by examiner

SUBSEA ASSEMBLY

CROSS REFERENCE TO RELATED APPLICATIONS

This application is the US National Stage of International Application No. PCT/EP2019/052402 filed 31 Jan. 2019, and claims the benefit thereof. The International Application claims the benefit of European Application No. EP18161549 filed 13 Mar. 2018. All of the applications are incorporated by reference herein in their entirety.

TECHNICAL FIELD

The present invention relates to subsea assembly and to a subsea sensor and to a method for attaching a subsea de-vice to a process fluid carrying component.

BACKGROUND

Subsea sensors such as temperature sensors or pressure sensors are essential components of any subsea processing facility. A subsea sensor may for example be mounted to a pipe section through which a process fluid flows, such as a gas, a liquid, or a multiphase fluid which can include gaseous, liquid and solid constituents. The process fluid pressure in some applications can be very high, for example in excess of 1000 or 1400 bar. While it is important for the process of extracting the process fluid to measure those high pressures with high accuracy it is similarly important to ensure that no process fluid leaks into the seawater under any circumstances.

The latter is ensured by strict mounting requirements such as for example described in standards ISO 10423 or API 6A. Essentially, a mounting flange having through holes is provided for the sensor which is mounted by means of bolts or screws or similar fixtures to a corresponding flange of the pipe section having threaded or through holes.

International patent applications WO2016/119943 (FIGS. 1 and 2) and WO2017/084769 (FIGS. 2 and 3) disclose such conventional sensor mounting flanges having 4 or 8 (or any other number of) through holes. The flanges may be integral part of the subsea sensor housing or welded to it or form-fitted onto the sensor assembly.

One disadvantage with those conventional flanges is that the dimensions (e.g. the diameter) of the actual sensor arrangement traversing the flange is limited by the dimensions of the circle or n-gon described be the flange's through holes and further reduced by the dimensions of the bolthead or nut holding the flange in place, and yet further reduced by the space required around the bolthead or nut to attach and operate the torque tightening tools thereto. To comply with above-identified standards it is mandatory to use studbolts and heavy hex nuts. Using socket head cap screws that require less space for both the screw head as well as for the corresponding torque tightening tool is not standard-compliant.

The result of these limiting factors can for example be seen in FIG. 2 of WO2017/084769 where the outer diameter of the flange/housing arrangement 210 is reduced where flange and housing meet so that there is room to apply a torque tightening tool, such as a low profile hydraulic wrench, around the hex nut. This reduced outer diameter determines the maximum inside dimensions available for the subsea sensor 220 and its electronics, noting that the housing's wall has a considerable minimum thickness as well as it is a second barrier between the process fluid and the seawater and as such needs to be able to withstand the high process fluid pressures and the even higher test pressures (1.5 or 2.5 the operating pressure).

Especially for small sensor fittings such as those employing a BX 150 gasket interface there may not be enough room inside the sensor housing's wall to accommodate advanced electronics such as required for dual pressure and/or temperature sensors.

It is therefore an object of the present invention to provide a subsea assembly and a subsea sensor which can be mounted using studbolts and heavy nuts as required by subsea standards such as ISO 10423 or API 6A and which allow for greater maximum dimensions of the subsea sensor and/or the subsea sensor's electronics.

SUMMARY

In accordance with one aspect of the present invention there is provided a subsea assembly comprising a housing having a flange interface for interfacing with a flange of a process fluid carrying component, wherein the housing is configured such that boltheads or nuts exerting a fastening force on the subsea assembly when mounted to the process fluid carrying component are spaced from the flange interface so that the dimensions of the housing of the subsea assembly at the flange interface are not affected by the space required for a bolthead or nut fastening tool.

Spaced from the flange interface, in this context, means that boltheads or nuts are located at a distance from the flange interface which is at least 30% of the housing's length.

In other words, instead of providing a conventional mounting flange at a first end of the housing according to the present invention the two key functions of the mounting flange are separated. The first function is that of interfacing with the flange of the process fluid carrying component which may comprise a form fitting, pressure and/or liquid tight interface comprising gaskets and the like. The second function is that of exerting a mounting pressure or fastening force in order to keep the sensor assembly securely attached to the flange of the process fluid carrying component, noting that the mounting pressure in the subsea environment can be substantial in order to securely maintain the interfacing function. By configuring the housing such that the boltheads or nuts exerting the fastening force are spaced from the flange interface said second function is spatially separated from said first function, thereby removing the need to provide extra space for the fastening tool near the flange interface. The extra space required for the fastening tool can thus be provided in a more convenient location along the length of the housing, for example at the end of the housing opposite of the flange interface.

In embodiments of the present invention the fastening function is effected by the housing which comprises through holes for accepting bolts for fastening the subsea assembly to the flange of the process fluid carrying component. The through holes may for example extend along the entire length of the housing from the second end of the housing to the first end of the housing. In other embodiments the through holes only extend along a portion of the housing, for example from the second end of the housing to a housing section spaced from the first end of the housing.

In other embodiments the fastening function is effected by a flange formed integrally with or fitted to the housing for accepting bolts for fastening the subsea assembly to the flange of the process fluid carrying component, wherein the flange is spaced from the flange interface for interfacing with the flange of the process fluid carrying component. The flange may be made of the same or a different metal or alloy as the housing. Again, spaced from the flange interface in this context means that the flange is located at a distance from the flange interface which is at least 30% of the housing's length.

The subsea assembly may advantageously be configured to accept four studbolts and heavy hex nuts for exerting the fastening force on the subsea assembly when mounted to the process fluid carrying component. In other embodiments more than four bolts may be provided, depending on the flange of the process fluid carrying component which in many cases will be a standard flange with which the subsea assembly needs to be compatible. Preferably the subsea assembly, in particular including the flange interface and the bolt hole arrangement, is configured to be mechanically compatible with a BX 150 gasket interface.

In accordance with another aspect of the present invention there is provided a subsea sensor comprising a subsea assembly as described above and a sensor element arranged at the first end of the subsea assembly such that the sensor is at least partially exposed to a process pressure prevailing inside the process fluid carrying component.

The subsea sensor may comprise at least one of a pressure sensor element or a temperature sensor element. In many embodiments the subsea sensor will comprise multiple sensor elements.

In accordance with another aspect of the present invention there is provided a method for attaching a subsea device to a process fluid carrying component having a flange, comprising fitting a flange interface of the subsea device to the flange and securing the subsea device to the process fluid carrying component with at least two bolts wherein the boltheads or nuts exerting a fastening force on the sub-sea device are spaced from the flange interface of the subsea device so that the dimensions of a housing of the subsea device at the flange interface are not affected by the space required for a bolthead or nut fastening tool.

Additionally to the advantages discussed above the present invention provides the advantage that standard-compliant studbolts and heavy hex nuts may be employed while at the same time the outer dimensions of the housing arrangement such as its outer diameter need not be reduced at the flange interface, as is the case in the prior art, because no room for applying a torque tightening tool needs to be provided. The housing dimensions are only limited by the geometry of the bolting holes provided in the flange of the process fluid carrying component.

Another advantage of the present invention lies therein that long bolts may be employed for attaching the subsea assembly to the flange of the process fluid carrying component. Long bolts are more stress-resistant than short bolts, for example because the lengthening of long bolts resulting from the fastening forces is more predictable than for short bolts.

Yet another advantage of some embodiments of the present invention is that no flange needs to be welded to the housing as is required in a typical prior art assembly. Instead the housing can be formed from a single piece of metal, allowing for a cheaper and faster production.

Yet another advantage of the present invention lies therein that the contact surface with the fluid carrying component is substantially smaller than for a prior art flanged arrangement, thereby reducing the heat transfer from a potentially hot process fluid to the sensor assembly and its electronic circuitry which thus is exposed to less thermal stress.

Yet another advantage of the present invention, especially when the nuts are arranged at the second end of the housing, is that the long bolts and heavy hex nuts provide improved control over the mounting force(s) and thus four bolts may be employed where otherwise eight bolts might be required.

DETAILED DESCRIPTION

Figure 1:
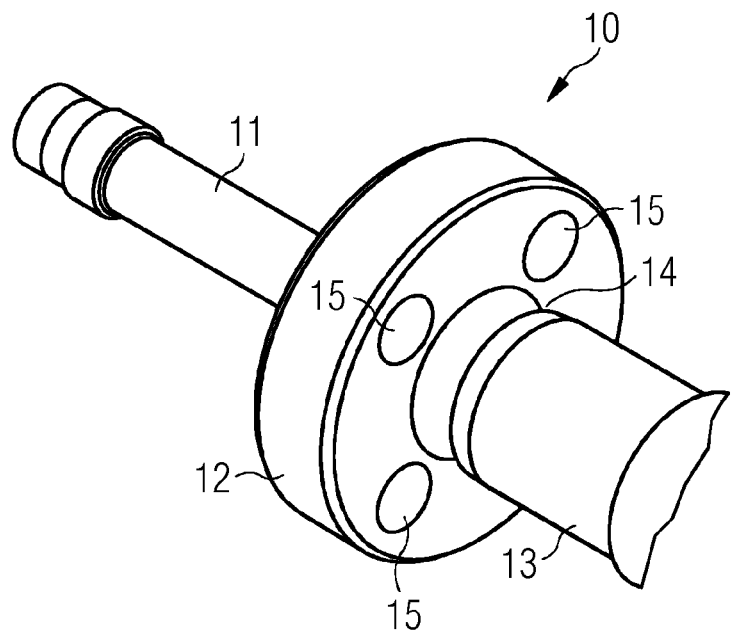
FIG. 1 shows a perspective partial view of a prior art subsea assembly.

Referring to FIG. 1 there is shown a perspective partial view of a prior art subsea assembly 10 as for example described in detail in WO2017/084769.

The sensor assembly 10 comprises a subsea sensor 11 and a mounting flange 12. The sensor assembly may further comprise a connection assembly (not shown) for providing the sensor's electrical connectivity to other components.

The sensor assembly 10 may be coupled by means of mounting flange 12 to a flange of a subsea flow line or subsea Christmas tree (not shown) in which a pressure and/or temperature of a fluid is to be detected and monitored.

Mounting flange 12 is attached (e.g. welded) to or integrally formed with a housing 13 of the sensor assembly 10. Mounting flange 12 comprises a total of four through holes 15 (three of which are shown) for accepting bolts for securing the mounting flange 12 to the flange of the process fluid carrying component.

The diameter of housing 13 is reduced at area 14 in order to provide space for attaching torque tightening tools to boltheads or nuts holding mounting flange 12 in place when the sensor assembly 10 is mounted to the flange of the process fluid carrying component.

Figure 2:
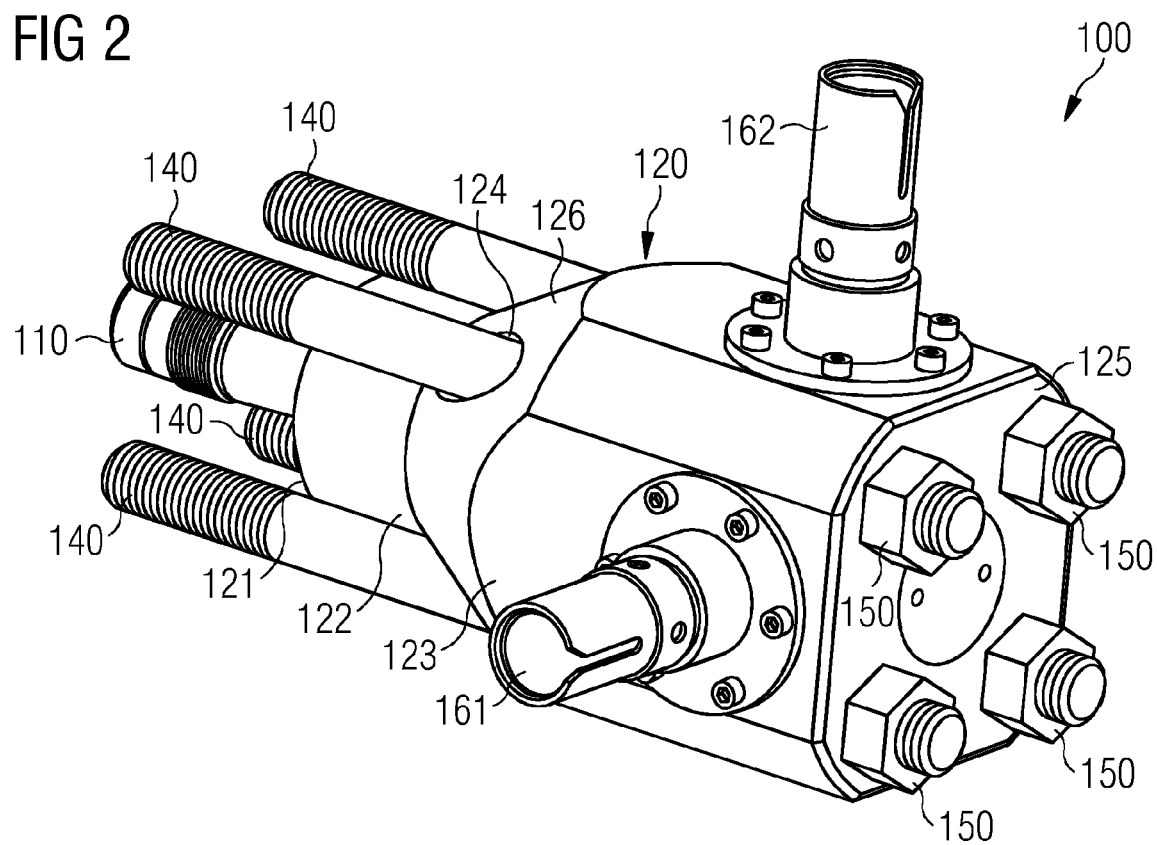
FIG. 2 shows a perspective schematic view of a subsea assembly in accordance with the present invention.

Referring now to FIG. 2 there is shown a perspective schematic view of a subsea assembly 100 in accordance with the present invention.

The subsea assembly 100 comprises a subsea sensor 110 and a housing 120. The housing has at its first end a flange interface 121 which, when the sensor assembly is mounted to a process carrying component (not shown), provides a fluid-tight connection between the housing and the flange of the process fluid carrying component. Note that the flange interface does not provide means for fastening the sensor assembly to a flange of a process fluid carrying component. Note further that the dimensions of the housing 120, which is shown to comprise an essentially cylindrical portion 122 extending from the first end, are only limited by the geometry of fastening bolts 140, which in turn is determined by the geometry of the bolting holes in the flange of the process fluid carrying component. In detail, the distance between the cylindrical housing portion 122 and each of the fastening bolts 140 may be very small, for example a few millimeters, or the bolts 140 and the housing portion 122 may even touch, because neither boltheads nor nuts nor tightening tools need to be fitted between bolts 140 and the housing portion 122, thereby allowing more room inside the housing portion 122 compared to conventional flanging arrangements as shown in FIG. 1.

Extending further from cylindrical housing portion 122 there is provided a second housing portion 123 which is essentially a cuboid having a square cross-section and radiused longitudinal edges. The square's side length is larger than the diameter of the cylindrical housing portion 122 and chosen such that through holes 124 for accepting the bolts 140 may be provided in the cuboid housing portion 123. An area 125 sufficient for boltheads or nuts 150 for securely exerting the fastening force on housing 120 is provided at a second end of housing 120.

The change in shape between the essentially cylindrical housing portion 122 and the essentially cuboid housing portion 123 is provided by an essentially conical housing portion 126 which extends from the essentially cylindrical housing portion 122 and increasing in diameter towards the essentially cuboid housing portion 123. The primary function of the conical housing portion 126 is to transfer forces and in particular the fastening forces exerted by the bolts 140 and boltheads or nuts 150 from the essentially cuboid housing portion 123 to the essentially cylindrical housing portion 122 and from there to the flange interface 121, noting that the fastening forces need to be such that the flange interface is securely pressed to the flange of the process fluid carrying component which may carry fluids of extreme pressures, for example in excess of 1000 bar or 1400 bar. The conical housing portion 126 avoids discontinuities in the force transfer that would occur if the essentially cuboid housing portion 123 would directly merge with the essentially cylindrical housing portion 122, thereby avoiding stress in the housing 120.

The subsea sensor 110 may be a dual output subsea sensor providing at least two measurements taken by two sensor elements. In embodiments, the sensor 110 may comprise two pressure sensor elements for two independent pressure measurements. In other embodiments, the sensor 110 may comprise two temperature sensor elements for two independent temperature measurements. In yet other embodiments, the sensor 110 may two pressure sensor elements and two temperature sensor elements for redundant measurement of both pressure and temperature of the process fluid.

Processed or raw sensor readings are output and processed by circuitry (not shown) inside the housing 120. As a key benefit of the present invention, the interior space available inside housing 120 is, for any given geometry of the flange of the process fluid carrying component, greater than the interior space available inside a prior art housing 13 because the outer dimensions of the housing 120 are less limited. Thereby multiple sensor elements and the associated circuitry may be accommodated inside the housing and/or the longitudinal extension of the housing can be smaller. Additionally, the increased space allows for larger coils and thus better transmission performance across an inner pressure barrier in connection with inductive penetrators as disclosed in published European patent application EP3269921 and in co-pending European patent applications 18151895.2, 18151885.3, 18151877.0, 18151854.9 filed on Jan. 16, 2018 by the same applicant.

In embodiments of the present invention at least one adapter 161 is provided so that a subsea cable (not shown) may be attached. For redundant configurations a second adapter 162 may be provided. First and second adapters 161, 162 are shown to be bolted to the essentially cuboid housing portion 123 and may be configured to accept corresponding standard connectors of subsea cables which provide sensor power and unidirectional or bidirectional data communication.

As mentioned above, in an embodiment through holes 124 for accepting the fastening bolts 140 are provided in the cuboid housing portion 123 and a flat surface 125 is provided at a second end of housing 120 opposite the first end for receiving the fastening forces exerted on housing 120 by the boltheads or nuts 150. A flat surface 125 is advantageous as it allows best tool access to the boltheads or nuts 150. Of course other surface shapes may be employed at the second end of housing 120 such as a surface having recesses for accepting the boltheads or nuts 150 as long as the second end of housing provides enough space for installing and torque-fastening the bolts and/or the nuts.

It should be noted that in other embodiments of the present invention the contact area for the boltheads or nuts 150 may be at a distance from the second end of housing 120 and for example be provided near the middle of the longitudinal extension of the housing 120.

It should further be noted that the described shapes (essentially cylindrical, essentially conical, essentially cuboid with radiused longitudinal edges) of the housing portions are exemplary and, while being optimal in the sense of material consumption, may be replaced by any other shape suitable for bearing the relevant forces. In particular the housing 120 may lack the essentially cylindrical and essentially conical portions and may be have an essentially cuboid shape (with our without radiused edges) along the entire longitudinal extension of the housing 120, in which case the bolt holes 124 extend along the entire length of the housing with the bolts 140 running inside the housing.

In yet other embodiments the fastening force may be applied to the housing by an flange that is formed integrally with or attached to the housing 120 at the second end or at a distance from the second end, for example near the middle of the longitudinal extension of the housing 120.

While specific embodiments are disclosed herein, various changes and modifications can be made without departing from the scope of the invention. The present embodiments are to be considered in all respects as illustrative and non restrictive, and all changes coming within the meaning and equivalency range of the appended claims are intended to be embraced therein.

The invention claimed is:

1. A subsea assembly comprising:
    a housing having a flange interface for interfacing with a flange of a process fluid carrying component,
    wherein the housing is configured such that boltheads or nuts exerting a fastening force on the subsea assembly when mounted to the process fluid carrying component are spaced from the flange interface so that dimensions of the housing of the subsea assembly at the flange interface are not affected by a space required for a bolthead or nut fastening tool, and wherein the housing comprises a conical housing portion that tapers inward toward the flange interface,
    wherein the housing comprises through holes for accepting bolts for fastening the subsea assembly to the flange of the process fluid carrying component, and
    wherein the through holes pass through an exterior surface of the conical housing portion.

2. The subsea assembly according to claim 1,
    wherein the flange interface is provided at a first end of the housing, and
    wherein the boltheads or the nuts exerting the fastening force on the subsea assembly when mounted to the process fluid carrying component are provided at a second end of the housing opposite of the first end of the housing.

3. The subsea assembly according to claim 1,
    wherein the through holes extend from a second end of the housing to a first end of the housing.

4. The subsea assembly according to claim 1,
wherein the through holes extend from a second end of the housing to a housing section spaced from a first end of the housing.

5. The subsea assembly according to claim 4, wherein the flange interface is provided at the first end of the housing, and wherein the second end of the housing does not protrude past the boltheads or the nuts exerting the fastening force on the second end.

6. The subsea assembly according to claim 1,
wherein the housing comprises a flange formed integrally with or fitted to the housing for accepting bolts for fastening the subsea assembly to the flange of the process fluid carrying component, wherein the flange is spaced from the flange interface for interfacing with the flange of the process fluid carrying component.

7. The subsea assembly according to claim 6,
wherein the flange is fitted to the housing and made of a metal or alloy different from the housing.

8. The subsea assembly according to claim 1,
configured to accept four studbolts and heavy hex nuts for exerting the fastening force on the subsea assembly when mounted to the process fluid carrying component.

9. The subsea assembly according to claim 1,
configured to be mechanically compatible with a BX 150 gasket interface.

10. The subsea assembly according to claim 1, wherein the housing comprises a first end comprising the flange interface and a second end, the subsea assembly further comprising a first adapter extending laterally from the housing and configured to accept a subsea cable.

11. A subsea sensor, comprising:
a subsea assembly according to claim 1, and
a sensor element that is disposed forward of the flange interface and is configured to be inserted into the process fluid carrying component such that the sensor element is at least partially exposed to a process pressure prevailing inside the process fluid carrying component.

12. The subsea sensor according to claim 11,
wherein the sensor element comprises at least one of a pressure sensor element or a temperature sensor element.

13. A method for attaching a subsea assembly to a process fluid carrying component having a flange, comprising:
fitting the flange interface of the subsea assembly of claim 1 to the flange;
securing the subsea assembly to the process fluid carrying component with at least two bolts;
wherein the boltheads or the nuts exerting the fastening force on the subsea assembly are spaced from the flange interface of the subsea assembly so that the dimensions of a housing of the subsea assembly at the flange interface are not affected by the space required for the bolthead or nut fastening tool.

14. A subsea assembly comprising:
a housing having a flange interface for interfacing with a flange of a process fluid carrying component,
wherein the housing is configured such that boltheads or nuts exerting a fastening force on the subsea assembly when mounted to the process fluid carrying component are spaced from the flange interface so that dimensions of the housing of the subsea assembly at the flange interface are not affected by a space required for a bolthead or nut fastening tool, and wherein the housing comprises a conical housing portion,
wherein the housing comprises through holes for accepting bolts for fastening the subsea assembly to the flange of the process fluid carrying component, and
wherein the through holes pass through an exterior surface of the conical housing portion.

* * * * *